United States Patent
Hyman et al.

(10) Patent No.: US 9,022,201 B1
(45) Date of Patent: May 5, 2015

(54) VERTICALLY STACKED CONVEYOR SYSTEM WITH DIVERSION CONVEYOR

(71) Applicant: Humana Inc., Louisville, KY (US)

(72) Inventors: Steve Hyman, Aubrey, TX (US); Atin Kapadia, Chandler, AZ (US); Michael Mahar, Phoenix, AZ (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 14/067,613

(22) Filed: Oct. 30, 2013

Related U.S. Application Data

(60) Provisional application No. 61/720,068, filed on Oct. 30, 2012.

(51) Int. Cl.
 *B65G 47/64* (2006.01)
 *B65G 47/71* (2006.01)
 *B65G 47/56* (2006.01)
 *B65G 47/46* (2006.01)

(52) U.S. Cl.
 CPC .............. *B65G 47/64* (2013.01); *B65G 47/71* (2013.01); *B65G 47/56* (2013.01); *B65G 47/46* (2013.01)

(58) Field of Classification Search
 CPC ........ B65G 47/46; B65G 47/56; B65G 47/64; B65G 47/71
 USPC ............ 198/369.1, 370.01, 370.02, 363, 435, 198/436, 442
 See application file for complete search history.

(56) References Cited

U.S. PATENT DOCUMENTS

| | | | | |
|---|---|---|---|---|
| 3,580,141 | A * | 5/1971 | Richter | 493/27 |
| 6,412,621 | B1 * | 7/2002 | De Vree et al. | 198/347.4 |
| 6,557,724 | B1 * | 5/2003 | LeCroy et al. | 221/76 |
| 7,878,366 | B2 * | 2/2011 | Cicognani | 221/7 |
| 8,074,781 | B1 * | 12/2011 | Reardon, Jr. | 198/392 |

* cited by examiner

*Primary Examiner* — Leslie A Nicholson, III
(74) *Attorney, Agent, or Firm* — Standley Law Group LLP

(57) ABSTRACT

A conveyor process and system for sorting objects having a plurality of inbound conveyors in a vertically stacked configuration and a plurality of diversion conveyors connected to the inbound conveyors for diverting objects transported on the inbound conveyors to a particular outbound conveyor.

11 Claims, 3 Drawing Sheets

VERTICALLY STACKED CONVEYOR SYSTEM WITH DIVERSION CONVEYOR

This application claims the benefit of U.S. Provisional Patent Application No. 61/720,068, filed on Oct. 30, 2012, titled Automated Pharmacy Sortation Wall, which is incorporated herein by reference.

BACKGROUND OF THE INVENTIVE FIELD

The present invention is directed to an improved conveyor system. More particularly, the present invention relates to a process of sorting individual material or product from multiple inbound conveyor lanes to multiple outbound conveyor lanes. In one embodiment, the present invention enables the movement of production vials to any lane with limited mechanical diverting.

Within a typical pharmacy production facility, there are automatic processes for the counting and sorting of pill tablets. For example, orders for vials of particular pills are processed automatically through an integrated system of pill counters and conveyors for transporting the vials to the appropriate outbound conveyor location (e.g., or a sorter location). Typically, these facilities are configured with multiple outbound conveyor lanes to allow for higher vial production volumes.

However, with this type of arrangement, multiple vials assigned to one specific order might be distributed to different take away or outbound conveyors which presents problems with the desired goal of getting all of the vials to reach the same downstream order sorter location. When a vial assigned to an order does not reach the designated order sorter location, the release of that order will be delayed, slowing order sorter throughput and diminishing overall productivity of the system.

Additional complications can also arise because demand for different drugs constantly changes which can result in high vial numbers occupying an inbound lane. To cope with these high vial numbers, the control system would have to transfer vials across conveyor lanes up to three times or more to keep both the load balanced on the inbound lane and get the vials to their correct order sorter location.

Accordingly, the preferred embodiment of the present invention provides a control system that:
- assigns an outbound order to a dedicated downstream order sorter location dependent upon the volume of vial load at each sorter;
- ensures that all the vials associated with a particular order reach their designated sorter location; and
- keeps the lanes exiting the banks of tablet counters balanced so that traffic flow did not slow or stall limiting productivity.

The present invention, including the physical arrangement of conveyor lanes, improves vial throughput, system efficiency and eliminates the need for balancing the vial load capacity of the inbound conveyor lanes.

SUMMARY OF THE GENERAL INVENTIVE CONCEPT

In the preferred embodiment of the present invention, vials on an inbound conveyor are diverted by moving the vial (e.g., by pushing) to a diversion conveyor that runs vertically to the multiple inbound conveyors that are stacked over each other. The diversion conveyor connects to all of the inbound conveyors that are stacked vertically so that vials moving on each of the inbound conveyors can be diverted onto the diversion conveyor. The number of diversion conveyors can vary based on the number of destination or sorter locations needed. For example, in one embodiment of the invention, there are at least three diversion conveyors operationally connected to each of the vertically stacked inbound conveyors where each of the three diversion conveyors lead to a different destination location. For example, the first diversion conveyor diverts vials intended for the sorter/bagger location for orders with multiple vials, the second diversion conveyor diverts vials intended for the sorter/bagger location for orders with single vials; and the third diversion conveyor diverts vials intended for the sorter/bagger location for multiple tote orders. In the preferred embodiment, the plurality of inbound conveyor lanes from the pill counter banks move from a horizontal position to a vertically stacked position.

In the preferred embodiment, the diversion conveyors run down the vertical direction in a stair-stepping configuration from one inbound conveyor lane to another. In one embodiment, this diversion conveyor creates a stair stepping pathway connecting to each inbound lane. Each destination or sorter location has its own dedicated outbound conveyor lane. Accordingly, each outbound conveyor lane has a dedicated diversion conveyor that connects to each inbound conveyor. Thereby, vials from each of the inbound lanes can be diverted to the appropriate outbound conveyor lane that leads to the desired sorter location.

As previously discussed, in the preferred embodiment, the control system of the present invention can also be preferably configured to assign an order to a downstream order sorter location dependent upon the volume of vial load at each sorter. The preferred embodiment of the control system also controls the diversion of vials from the inbound lanes so as to keep the lanes exiting the banks of tablet counters balanced so that traffic flow does not slow or stall limiting productivity In the preferred embodiment, the resulting conveyor arrangement and control system allows an order to get from any inbound conveyor on the stack to any sorter with a maximum of one mechanical diversion. Every time a vial is diverted, the total vial number on the inbound conveyor decreases. The preferred embodiment of the present invention eliminates the need for line or load balancing on the inbound conveyor. If the conveyor configuration had remained in a horizontal arrangement, some form of load balancing would have been required. Balancing of the conveyor traffic is preferably reduced to only the outbound conveyors (e.g., the load at the sorters).

This same process of sortation can be applied to increased or decreased numbers of inbound or outbound conveyor configurations. In one embodiment for example, the configuration included four inbound and five outbound lanes. This process and hardware configuration works similarly with other configurations such as five inbound and three outbound or six inbound and ten outbound conveyor lanes.

This process of sortation can also be applied to virtually any transport system including the movement of boxes, totes, soft packages, etc. and is not limited to the specific sortation of pill vials.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
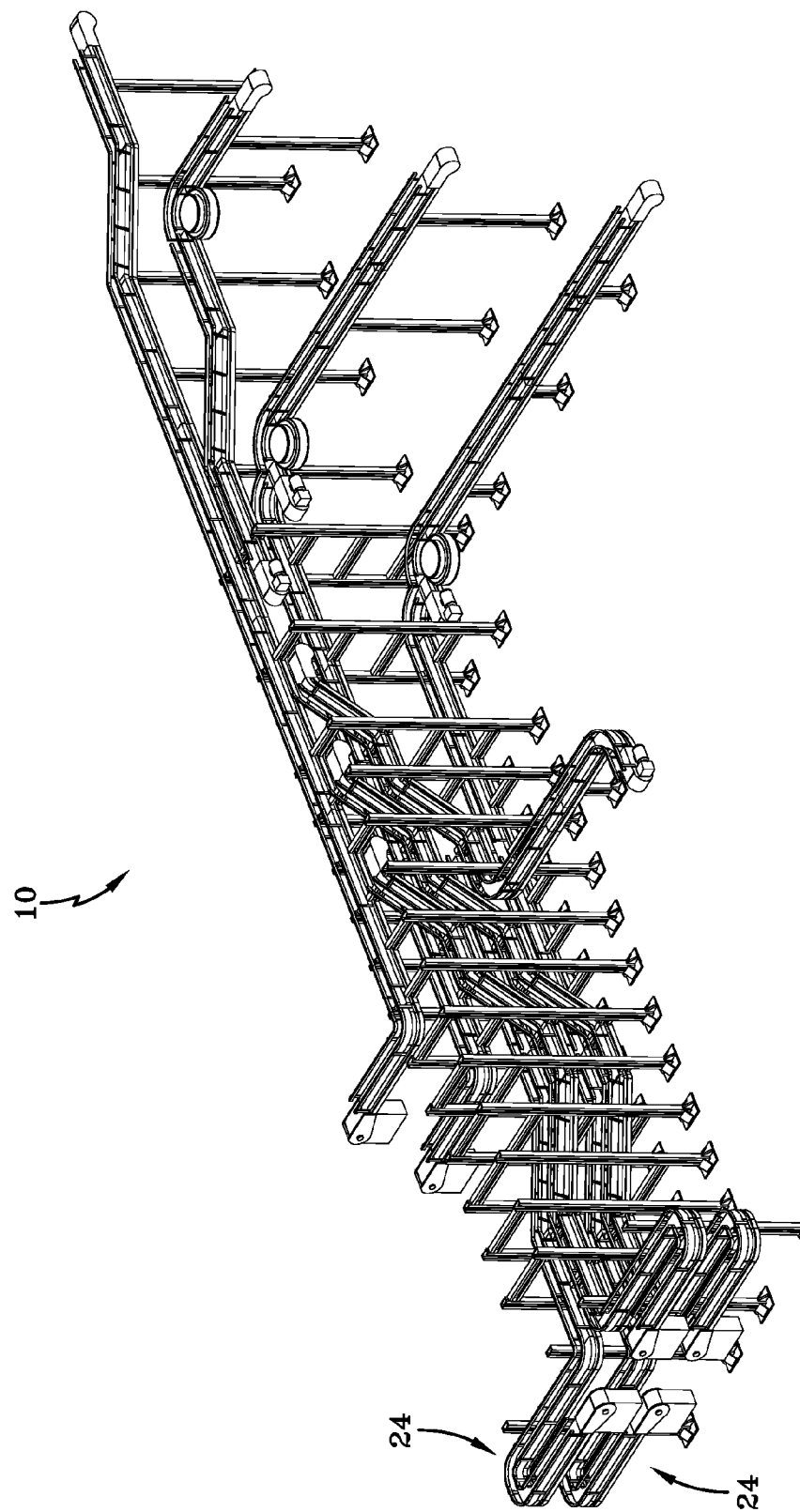
FIG. 1 illustrates one embodiment of the conveyor system of the present invention.
Figure 2:
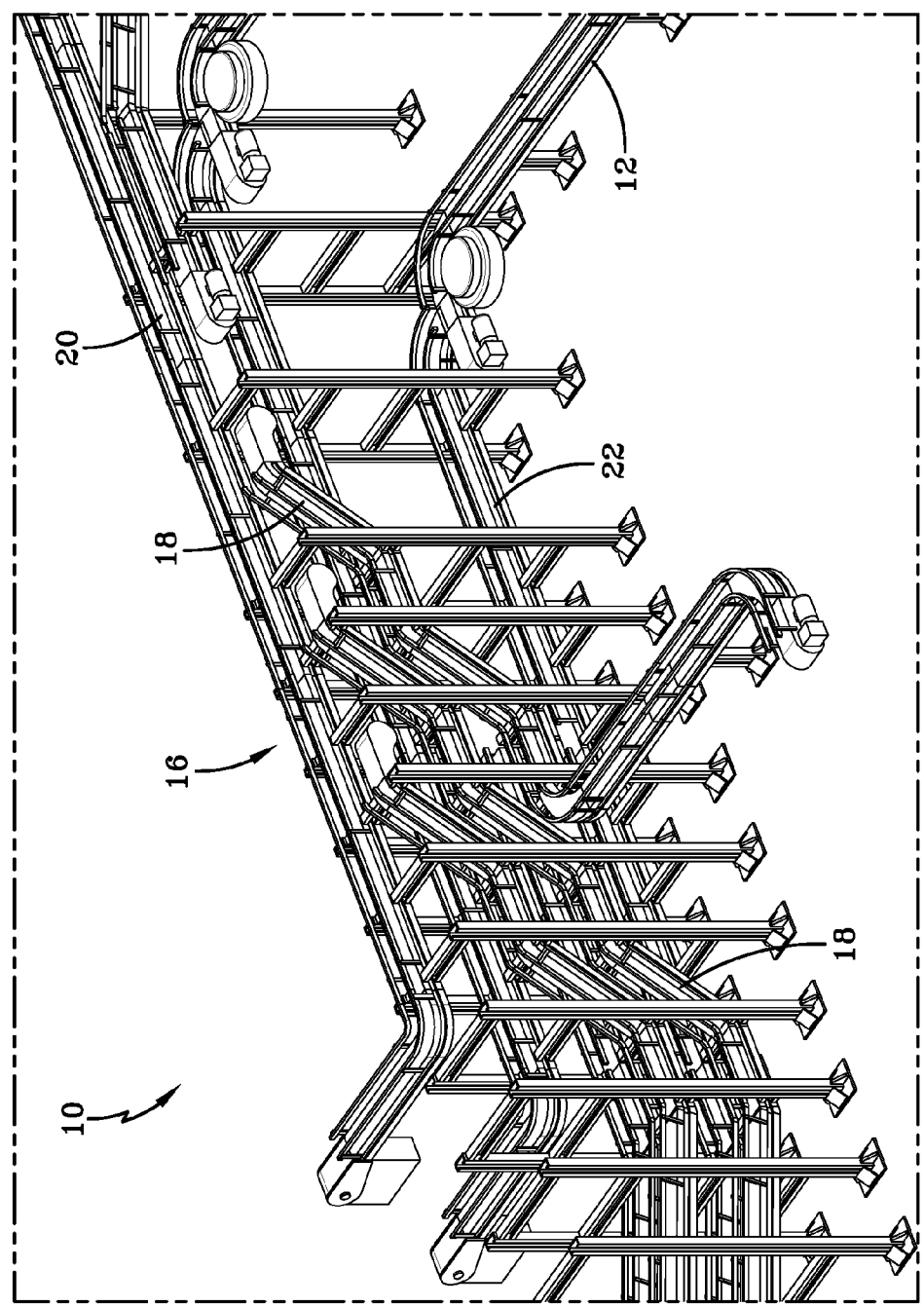
FIG. 2 illustrates another view of the conveyor system of the present invention.

FIG. 1 illustrates one embodiment of the conveyor system 10 of the present invention. FIG. 2 illustrates another view of the conveyor system 10 of the present invention. In the preferred embodiment, the plurality of inbound conveyor lanes 12 from the pill counter banks move from a horizontal position to a vertically stacked position.

On either side of the vertical stack 16 of inbound conveyors, a plurality of diversion conveyors 18 run from the top inbound conveyor 20 to the inbound conveyor directly below, and so on all the way to the bottom conveyor 22 of the vertical stack. In one embodiment, this diversion conveyor creates a stair stepping pathway connecting to each inbound lane. Each sorter location 24 has its own dedicated outbound conveyor lane. Accordingly, each outbound conveyor lane has a dedicated diversion conveyor that operationally connects to each inbound conveyor so that vials from each of the inbound conveyor lanes can be moved onto each of the diversion conveyors depending where the vial's ultimate destination location. For example, if it is single vial order, the vial will be moved onto the diversion conveyor dedicated to moving the vials to the sorter or bagger location for single vial orders. Thereby, vials from each of the inbound lanes can be diverted to the appropriate outbound conveyor lane 26 that leads to the desired sorter location.

Figure 3:
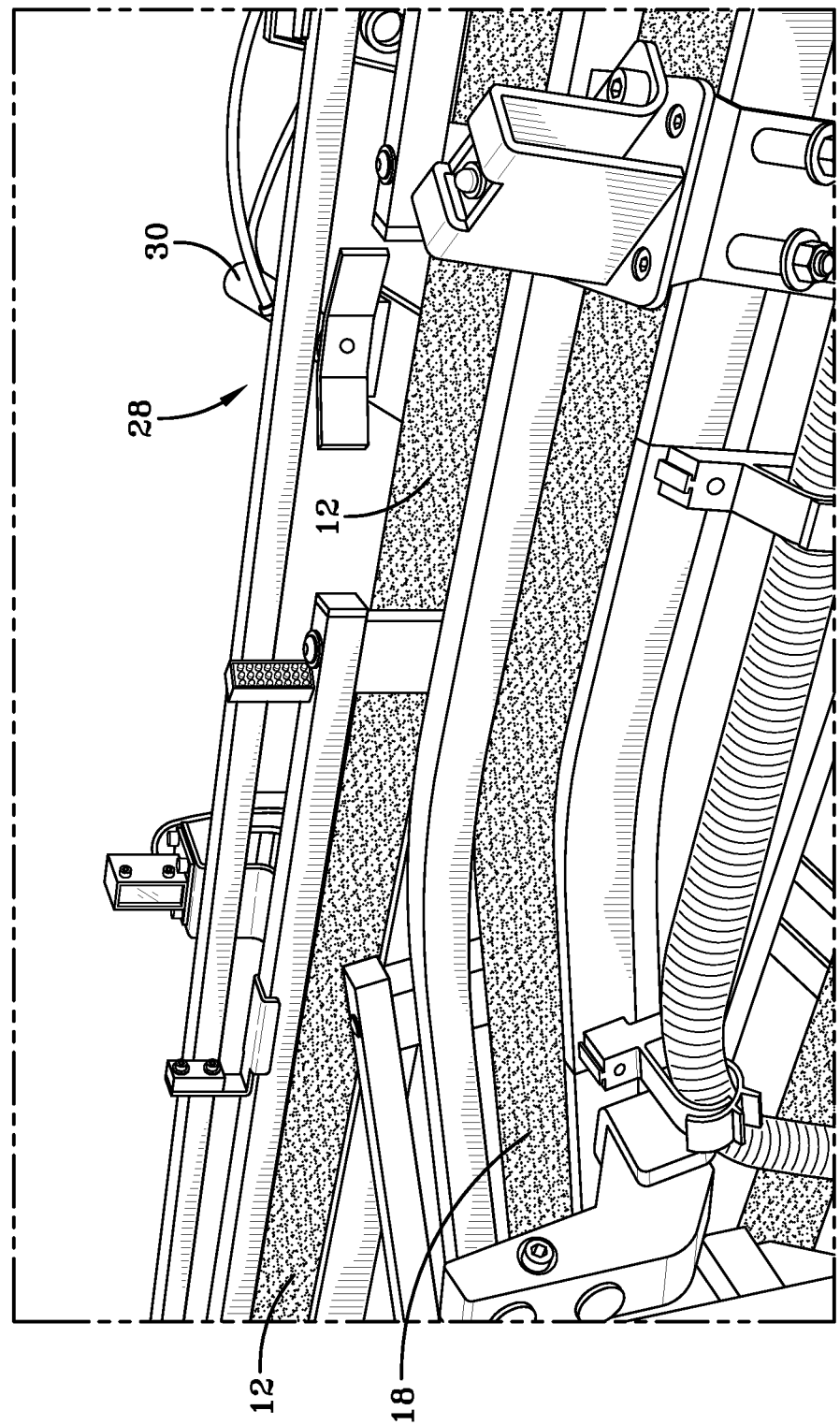
FIG. 3 illustrates one embodiment of the mechanical diversion hardware of the present invention.

FIG. 3 illustrates a close up view of one embodiment of the diversion conveyor of the present invention; and FIG. 4 illustrates one embodiment of the mechanical diversion hardware 28 of the present invention. In this embodiment, a push rod 30 is actuated to push the vial onto the diversion conveyor.

As previously discussed, in the preferred embodiment, the control system of the present invention is preferably configured to assign an order to a downstream order sorter location dependent upon the volume of vial load at each sorter. The preferred embodiment of the control system also controls the diversion of vials from the inbound lanes so as to keep the lanes exiting the banks of tablet counters balanced so that traffic flow does not slow or stall, limiting productivity.

In the preferred embodiment, the resulting conveyor arrangement and control system allows an order to get from any inbound conveyor on the stack to any sorter with a maximum of one mechanical diversion. Every time a vial is diverted, the total vial number on the inbound conveyor decreases. The preferred embodiment of the present invention eliminates the need for line or load balancing on the inbound conveyor. If the conveyor configuration had remained in a horizontal arrangement, some form of load balancing would have been required. Balancing of the conveyor traffic is preferably reduced to only the outbound conveyors (e.g., the load at the sorters).

This same process of sortation can be applied to increased or decreased numbers of inbound or outbound conveyor configurations. In one embodiment for example, the configuration includes four inbound and five outbound lanes. This process and hardware configuration works similarly with other configurations such as five inbound and three outbound or six inbound and ten outbound conveyor lanes.

While certain embodiments of the present invention are described in detail above, the scope of the invention is not to be considered limited by such disclosure, and modifications are possible without departing from the spirit of the invention as evidenced by the following claims:

What is claimed is:

1. A conveyor system comprising:
   a plurality of inbound conveyors for transporting objects from a source location, wherein at least a portion of the plurality of inbound conveyors are in a vertically stacked configuration;
   a plurality of outbound conveyors for transporting objects to a destination location;
   a plurality of diversion conveyors, one for each outbound conveyor, and wherein each diversion conveyor is connected to each of the inbound conveyors for diverting objects from the inbound conveyors to a particular one of the outbound conveyors; and
   horizontal diversion hardware for pushing vials from each of the inbound conveyors to each of the diversion conveyors.

2. A conveyor system according to claim 1, further comprising a control system electrically connected to the conveyor system and configured to assign an order to a downstream sorter location dependent upon the volume of load at each sorter.

3. A conveyor system according to claim 1, wherein the source location for each inbound conveyor is a pill counter unit.

4. A conveyor system according to claim 1, wherein the destination location is a sorter location for packaging orders.

5. A conveyor system according to claim 1, wherein the destination location is a pill vial sorter location for packaging orders.

6. A conveyor system according to claim 1, wherein each diversion conveyor is in a stair step configuration for transporting objects from the inbound conveyors to the outbound conveyors.

7. A conveyor system comprising:
   a plurality of inbound conveyors for transporting objects from a source location, wherein at least a portion of the plurality of inbound conveyors are in a vertically stacked configuration;
   a plurality of outbound conveyors, each of the plurality of outbound conveyors configured for transporting objects to a particular destination location; and
   a plurality of diversion conveyors, each of the plurality of diversion conveyors operationally connected to one the outbound conveyors, and wherein each diversion conveyor is operationally connected to each of the inbound conveyors for diverting objects from the inbound conveyors to a particular one of the outbound conveyors;
   a plurality of diversion mechanisms, where one of the plurality of diversions mechanisms are located where each of the diversion conveyors are operationally connected to each of the plurality of inbound conveyors for moving vials from the inbound conveyors to the diversion conveyors;
   a processing system in electrical communication with each of the diversion mechanisms, the processing system programmed with one or more software routines executing on the processing system to: 1) control the movement of each of the diversion mechanisms to control diversion of moving vials from the inbound conveyors to a particular diversion conveyor based on the intended destination location for the vials; and wherein each of the diversion conveyors run in the vertical direction is a stair-stepping configuration.

8. A conveyor system comprising:

a plurality of inbound conveyors for transporting objects from a source location, wherein at least a portion of the plurality of inbound conveyors are in a vertically stacked configuration;

a plurality of outbound conveyors, each of the plurality of outbound conveyors configured for transporting objects to a particular destination location; and a plurality of diversion conveyors, each of the plurality of diversion conveyors operationally connected to one of the outbound conveyors, and wherein each diversion conveyor is operationally connected to each of the inbound conveyors for diverting objects from the inbound conveyors to a particular one of the outbound conveyors;

a plurality of diversion mechanisms, where one of the plurality of diversions mechanisms are located where each of the diversion conveyors are operationally connected to each of the plurality of inbound conveyors for moving objects from the inbound conveyors to the diversion conveyors;

a processing system in electrical communication with each of the diversion mechanisms, the processing system programmed with one or more software routines executing on the processing system to: 1) control the movement of each of the diversion mechanisms to control diversion of moving objects from the inbound conveyors to a particular diversion conveyor based on the intended destination location for the objects.

9. A conveyor system according to claim 8, wherein each of the plurality of diversion conveyors run vertical in a stair-stepping configuration.

10. A conveyor system according to claim 8, wherein the objects being transported by are pill vials.

11. A conveyor system according to claim 8, wherein the processing system programmed with one or more software routines executing on the processing system to control diversion of the objects based on loads at the destination locations.

* * * * *